(12) United States Patent
Chujo et al.

(10) Patent No.: US 10,403,870 B2
(45) Date of Patent: Sep. 3, 2019

(54) BATTERY MODULE

(71) Applicant: KABUSHIKI KAISHA TOYOTA JIDOSHOKKI, Aichi (JP)

(72) Inventors: Yuki Chujo, Aichi (JP); Takayuki Kato, Aichi (JP); Hiromi Ueda, Aichi (JP); Naoto Morisaku, Aichi (JP); Masahiro Yamada, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 72 days.

(21) Appl. No.: 15/525,191

(22) PCT Filed: Oct. 14, 2015

(86) PCT No.: PCT/JP2015/079030
§ 371 (c)(1),
(2) Date: May 8, 2017

(87) PCT Pub. No.: WO2016/076056
PCT Pub. Date: May 19, 2016

(65) Prior Publication Data
US 2018/0069219 A1    Mar. 8, 2018

(30) Foreign Application Priority Data

Nov. 10, 2014  (JP) .................................. 2014-227831
Feb. 9, 2015  (JP) .................................. 2015-023455

(51) Int. Cl.
*H01M 2/10*  (2006.01)
(52) U.S. Cl.
CPC ....... *H01M 2/1094* (2013.01); *H01M 2/1016* (2013.01); *H01M 2/1077* (2013.01)

(58) Field of Classification Search
None
See application file for complete search history.

(56) References Cited

U.S. PATENT DOCUMENTS 6,358,641 B1 *  3/2002  Mease ................. H01M 8/0247
                                                       429/470
7,125,628 B2 * 10/2006  Marukawa .......... H01M 2/1077
                                                       429/149

(Continued)

FOREIGN PATENT DOCUMENTS

CN      103038915      4/2013
JP      2003-36830     2/2003

(Continued)

OTHER PUBLICATIONS

International Search Report, along with English-language translation thereof, issued in PCT/JP2015/079030 dated Dec. 8, 2015.

(Continued)

*Primary Examiner* — Alix E Eggerding
(74) *Attorney, Agent, or Firm* — Greenblum & Bernstein, P.L.C.

(57) ABSTRACT

A battery module is provided and includes an array body in which a plurality of battery cells are arrayed, an elastic member disposed on at least one side in an array direction of the array body, a pair of end plates holding the array body and the elastic member therebetween, a resin middle plate disposed between the array body and the elastic member, and a metal joining member joining the pair of the end plates each other, in which the middle plate is provided with a through hole through which the joining member is inserted, and a metal collar is inserted through the through hole.

20 Claims, 13 Drawing Sheets

(56) References Cited

U.S. PATENT DOCUMENTS

| | | |
|---|---|---|
| 2003/0017387 A1 | 1/2003 | Marukawa et al. |
| 2012/0021271 A1* | 1/2012 | Tople ............... H01M 10/0481 |
| | | 429/120 |
| 2013/0330579 A1 | 12/2013 | Ejiri et al. |
| 2014/0342207 A1 | 11/2014 | Tople et al. |
| 2016/0141737 A1* | 5/2016 | Kubota ............... H01M 10/613 |
| | | 429/120 |

FOREIGN PATENT DOCUMENTS

| | | |
|---|---|---|
| JP | 2010-9989 | 1/2010 |
| JP | 2013-8479 | 1/2013 |
| JP | 2013-235728 | 11/2013 |
| JP | 2014-157725 | 8/2014 |
| KR | 10-0709262 | 4/2007 |
| WO | 2012/131837 | 10/2012 |

OTHER PUBLICATIONS

Written Opinion of the International Searching Authority, along with English-language translation thereof, issued in PCT/JP2015/079030 dated Dec. 8, 2015.

International Preliminary Report on Patentability issued in PCT/JP2015/079030 dated May 16, 2017.

Office Action in counterpart Chinese Application No. 201580060358.6, dated Feb. 28, 2019.

* cited by examiner

*Fig.2*
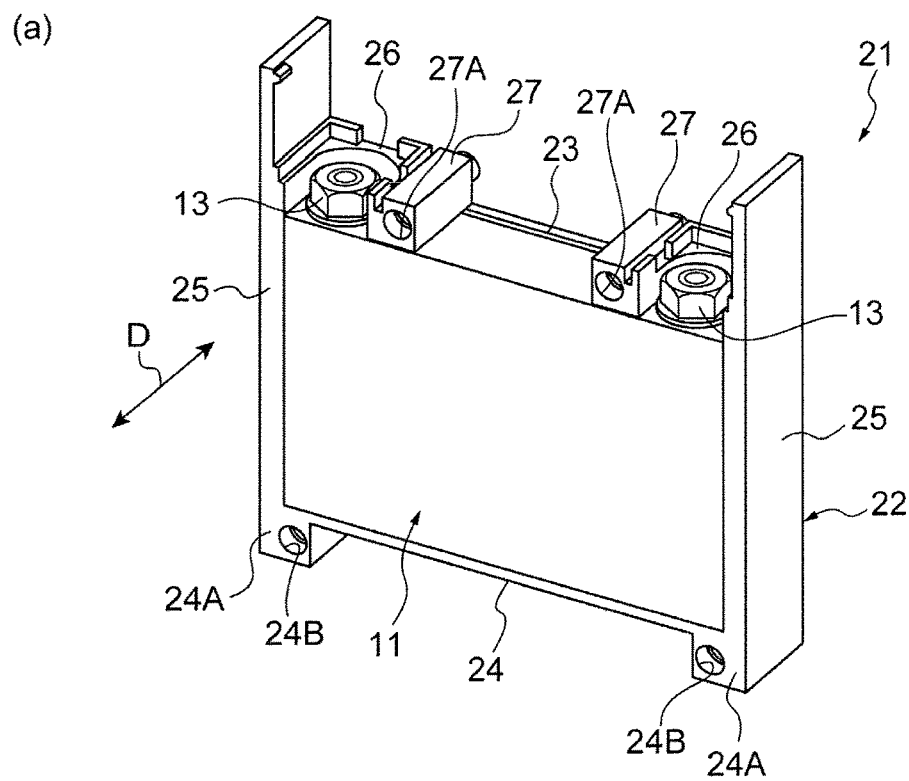
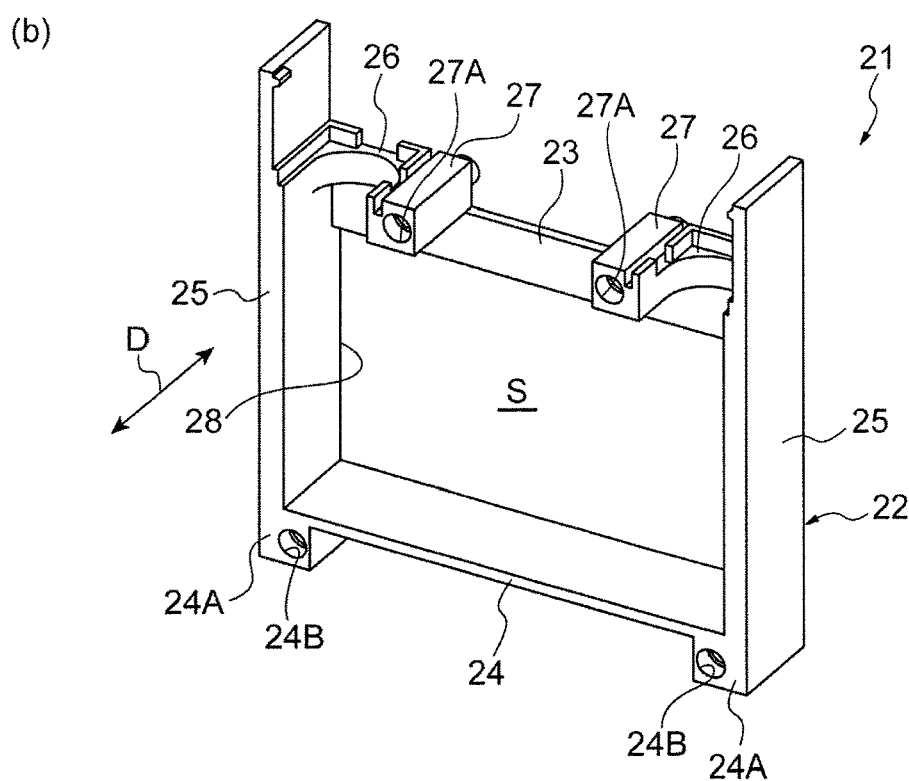

Fig.3
(a)
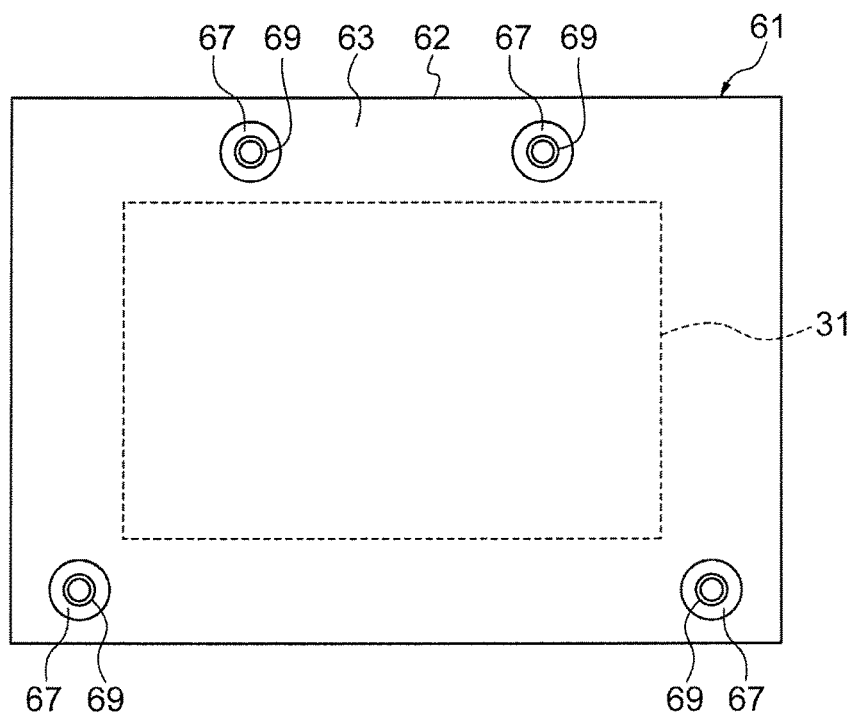
(b)
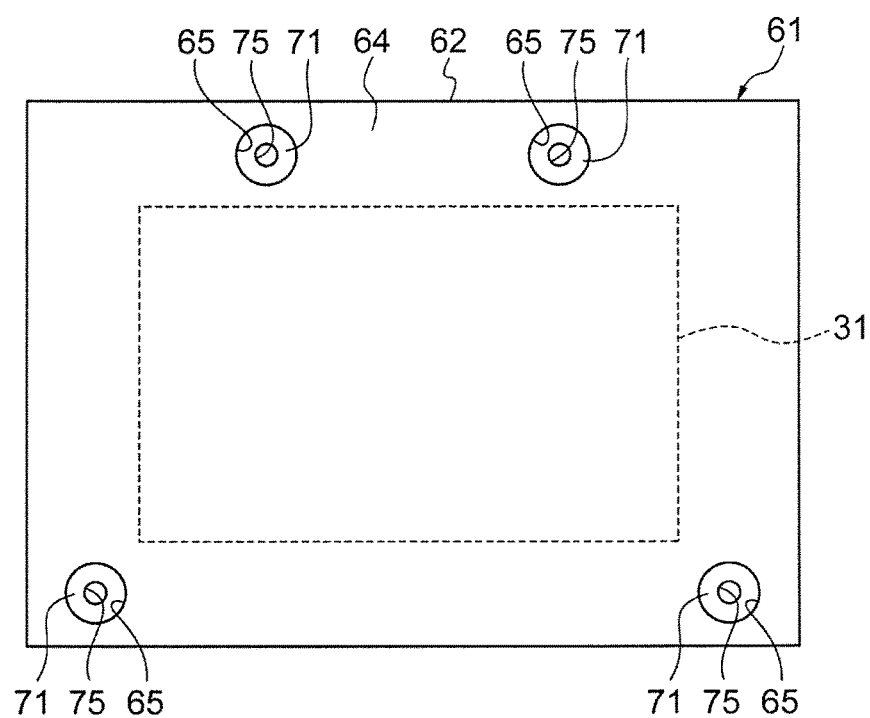

Fig.9
(a)
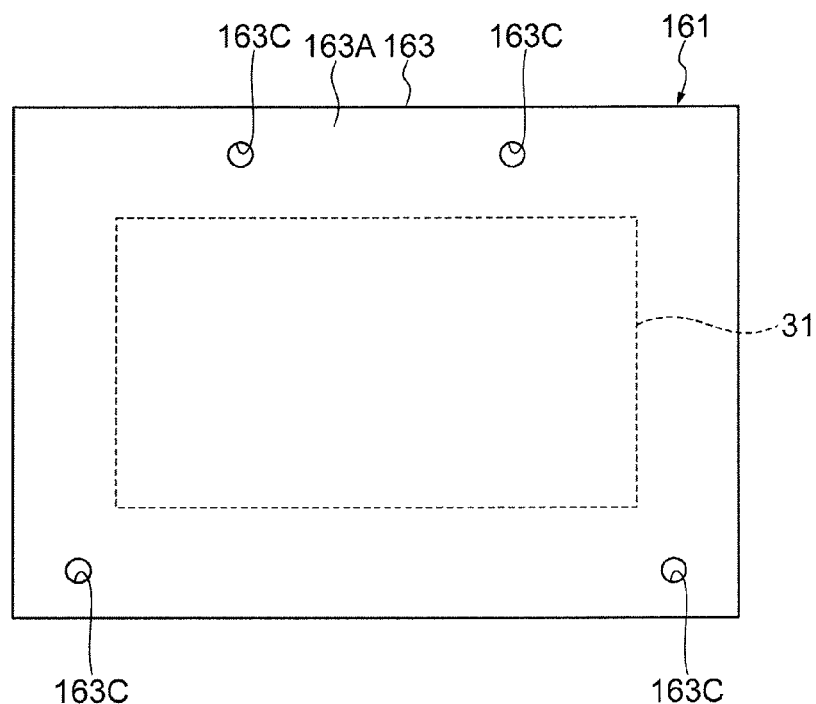
(b)
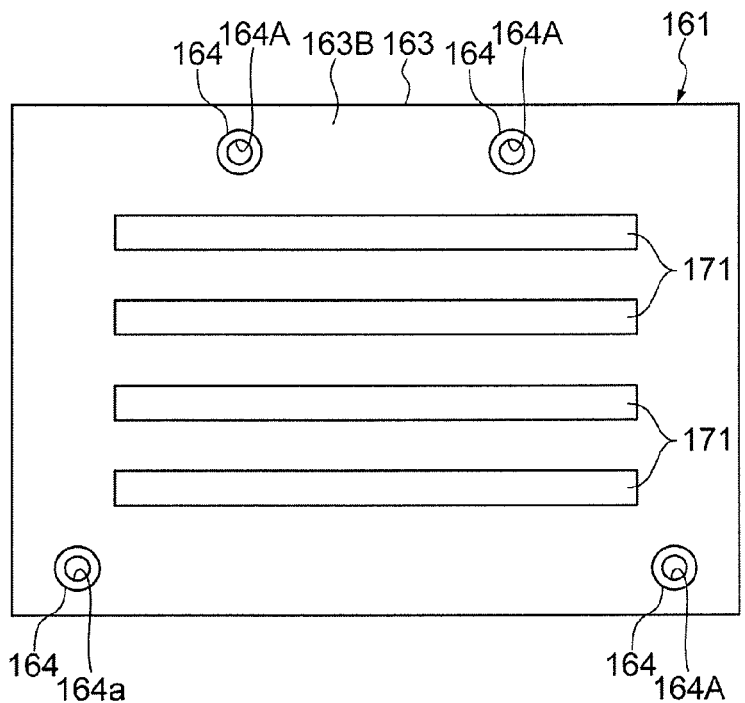

Fig.10
(a)
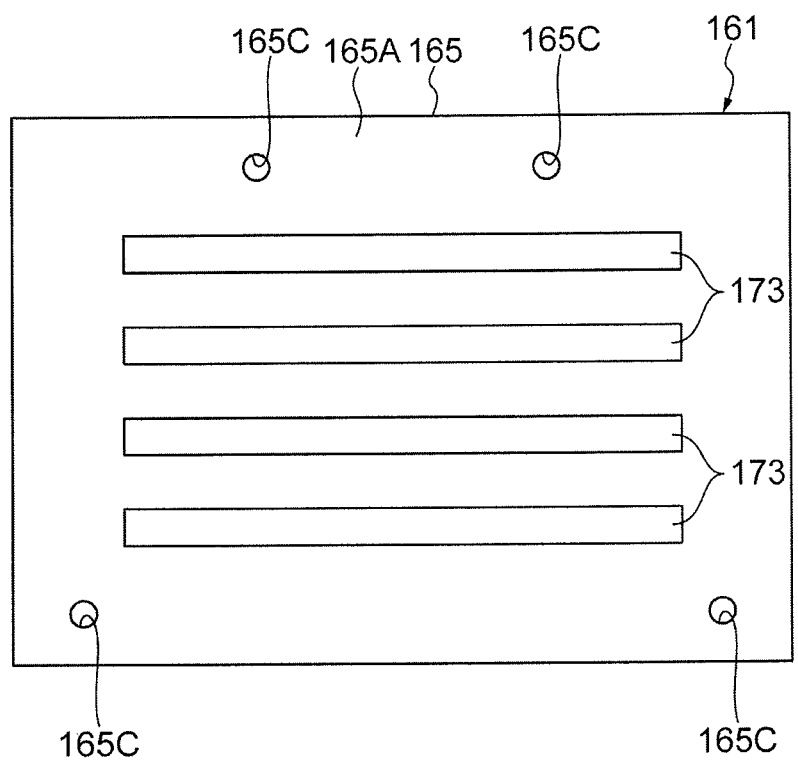
(b)
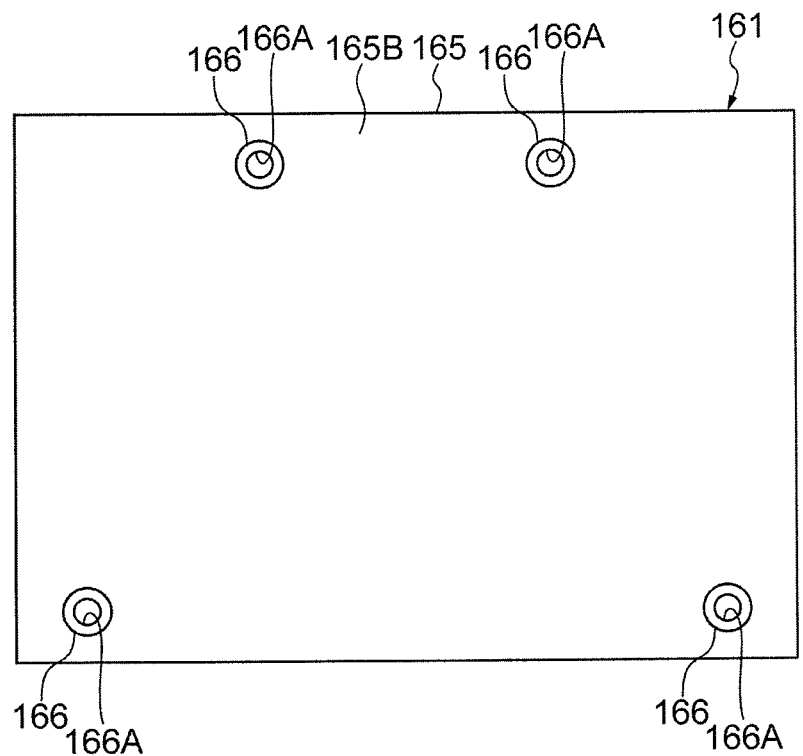

BATTERY MODULE

TECHNICAL FIELD

The present invention relates to a battery module.

BACKGROUND ART

As an example of a battery module, a battery module disclosed in Patent Document 1 exists. The battery module of Patent Document 1 includes an array body in which a plurality of battery cells are arrayed, a pair of end plates holding the array body from both sides, a pair of pressing plates (middle plates) disposed between the array body and the respective end plates, and a tie rod (joining member) joining the pair of end plates. A compression spring is disposed between the end plate and the middle plate, and the middle plate presses the array body by urging force of the compression spring. Each of the middle plates is provided with a through hole, and the joining member is inserted through the through hole.

CITATION LIST

Patent Literature

Patent Document 1: Japanese Unexamined Patent Publication No. 2003-36830

SUMMARY OF INVENTION

Technical Problem

In the battery module of Patent Document 1 described above, the middle plates contact both the battery cells and the joining member. The joining member is generally formed of metal. For this reason, when the middle plates are formed of metal, the battery cells and the joining member may be short-circuited. In the battery module, because the joining member is used in an exposed state, the battery cells are preferably insulated from the joining member. In addition, in such a battery module, when an impact acts thereon, a relatively large shear load may act on the through hole parts of the middle plates from the joining member, and the middle plates may be broken in the parts.

The present invention has been made in view of the circumstances described above. An object of the present invention is to provide a battery module enabling improvement of strength of the middle plates against shear load, while securing insulation between the battery cells and the joining member.

Solution to Problem

A battery module according to an aspect of the present invention includes an array body in which a plurality of battery cells are arrayed, an elastic member disposed on at least one side in an array direction of the array body, a pair of end plates holding the array body and the elastic member therebetween, a resin middle plate disposed between the array body and the elastic member, and a metal joining member joining the pair of end plates, in which the middle plate is provided with a through hole through which the joining member is inserted, and a metal collar is inserted through the through hole.

In the battery module, because the middle plate is formed of resin, the battery cells and the joining member are not short-circuited, even when the middle plate contacts both the battery cells and the joining member. This structure secures insulation between the battery cells and the joining member. In addition, because the metal collar (collar formed of metal) is inserted through the through hole of the middle plate, a shear load can be received with the metal collar. This structure enhances the strength of the middle plate against a shear load. Accordingly, the battery module enables improvement of strength of the middle plates against shear load, while securing insulation between the battery cells and the joining member.

In the battery module according to an embodiment of the present invention, in the middle plate, an opposed surface opposed to the array body may be provided with a resin shield portion shielding one end surface of the metal collar. In this case, the shield portion separates the metal collar from the battery cells, and secures insulation between the metal collar and the battery cells.

In the battery module according to an embodiment of the present invention, in the middle plate, an opposed surface opposed to the array body may be provided with a resin cylindrical portion through which the joining member is inserted. In this case, the cylindrical portion separates the joining member from the battery cells, and secures insulation between the joining member and the battery cells.

In the battery module according to an embodiment of the present invention, each of the battery cells may be held with a cell holder, and the cell holder may be provided with an insertion hole through which the cylindrical portion is inserted together with the joining member. In this case, in assembly, the middle plate and the cell holders can be easily positioned by inserting the cylindrical portion through the insertion holes, and the assembling property can be improved.

In the battery module according to an embodiment of the present invention, in the middle plate, the opposed surface opposed to the elastic member may be flush with the other end surface of the metal collar. In the case where the metal collar projects from the middle plate, when a shear load acts on the middle plate, the load may concentrate on the projecting portion, and the middle plate may be broken in the portion. With respect to this point, the battery module avoids such concentration of load, because the opposed surface of the middle plate opposed to the elastic member is flush with the other end surface of the metal collar.

A battery module according to an aspect of the present invention includes an array body in which a plurality of battery cells are arrayed, an elastic member disposed on at least one side in an array direction of the array body, a pair of end plates holding the array body and the elastic member therebetween, a resin middle plate disposed between the array body and the elastic member, and a metal joining member joining the pair of end plates, wherein the middle plate is provided with a through hole through which the joining member is inserted, and, in the middle plate, an opposed surface opposed to the array body is provided with a resin cylindrical portion communicating with the through hole.

In the battery module, because the middle plate is formed of resin, even when the middle plate contacts both the battery cells and the joining member, the battery cells and the joining member are not short-circuited. This structure secures insulation between the battery cells and the joining member. In addition, insulation between the battery cells and the joining member is secured also from the structure in which the battery cells are separated from the joining member with the cylindrical portion. Besides, because the thickness around the through hole in the middle plate can be increased by providing the cylindrical portion, the strength of the middle plate against a shear load can be improved. Accordingly, the battery module enables improvement of strength of the middle plate against shear load, while securing insulation between the battery cells and the joining member.

In the battery module according to an embodiment of the present invention, each of the battery cells may be held with a cell holder, and the cell holder may be provided with an insertion hole through which the cylindrical portion is inserted together with the joining member. In this case, in assembly, the middle plate and the cell holders can be easily positioned by inserting the cylindrical portion through the insertion holes, and the assembling property can be improved.

A battery module according to an aspect of the present invention includes an array body in which a plurality of battery cells are arrayed, an elastic member disposed on at least one side in an array direction of the array body, a pair of end plates holding the array body and the elastic member therebetween, a joining member joining the pair of end plates, and a middle plate disposed between the array body and the elastic member, wherein the middle plate includes a reinforcing portion formed of a metal material and an insulating portion formed of an insulating material, and the reinforcing portion and the insulating portion contact each other.

In the battery module with this structure, the reinforcing portion formed of a metal material is disposed as part of the middle plate. This structure improves the strength of the whole middle plate. In addition, the insulating portion formed of an insulating material is disposed as part of the middle plate between the array body and the end plate. This structure secures insulation between the array body formed of a plurality of arrayed battery cells and the end plate. As a result, this structure provides a battery module with excellent durability, while securing insulation between the battery cells and the end plate.

In the battery module according to an embodiments of the present invention, the reinforcing portion may be disposed on the elastic member side, and the insulating portion may be disposed on the array body side.

The battery module with the structure removes the necessity for actively providing an insulation structure between the insertion hole and the insertion hole through which the joining member is inserted, in the reinforcing member.

In the battery module according to an embodiments of the present invention, the joining member may be inserted through a first insertion hole formed in the reinforcing portion and a second insertion hole formed in the insulating portion, and an internal diameter of the first insertion hole may be smaller than an internal diameter of the second insertion hole.

In the middle plate, damage easily occurs particularly in a portion that the joining member contacts in the insertion hole through which the joining member is inserted. In the battery module with the structure, the joining member inserted through the first insertion hole and the second insertion hole contacts only the reinforcing portion provided with the first insertion hole having the smaller internal diameter. This structure suppresses occurrence of damage in comparison with the case where the joining member contacts the second insertion hole of the insulating portion.

In the battery module according to an embodiments of the present invention, the reinforcing portion may be provided with a cylindrical portion projected to the insulating portion side and including an inner space portion communicating with the first insertion hole, and the cylindrical portion may be inserted through the second insertion hole.

In the battery module with the structure, because the cylindrical portion projecting from the reinforcing portion to the insulating portion side is inserted through the insertion hole of the insulating portion, movement of the insulating portion with respect to the reinforcing portion is restrained. This structure prevents the insulating portion from being shifted from the predetermined position, and suppresses occurrence of short circuit due to contact of the array body and the reinforcing portion.

In the battery module according to an embodiments of the present invention, an insulating member may be disposed between an internal circumferential surface of the first insertion hole and an external circumferential surface of the joining member.

The battery module with the structure prevents short circuit of the array body and the reinforcing portion via the joining member.

In the battery module according to an embodiments of the present invention, opposed surfaces in the respective insulating portion and reinforcing portion may be provided with a projections and a depression that are projected and depressed in mutually opposite directions, and the insulating portion and the reinforcing portion may be mutually fitted with the projection and the depression.

The battery module with the structure suppresses shift of the position of the insulating portion with respect to the reinforcing portion, because movement of the insulating portion is restrained with respect to the reinforcing portion. This structure suppresses occurrence of short circuit due to contact of the array body and the reinforcing portion. The projection and the depression of them may be fitted in a state with play each other, or may be fitted in a state without play each other.

In the battery module according to an embodiments of the present invention, the projection in the projection and the depression may be formed in the reinforcing portion.

In the battery module with the structure, the projection that is easily damaged in comparison with the depression is enabled to be formed of a metal material with relatively high strength in comparison with the insulating material. This structure suppresses damage to the projection.

In the battery module according to an embodiments of the present invention, when a first area is an area of a surface orthogonal to an extending direction of the joining member in the reinforcing portion and a second area is an area of a surface orthogonal to an extending direction of the joining member in the insulating portion, the second area may be larger than the first area.

In the battery module with the structure, even when the reinforcing portion is slightly shifted from the insulating portion, the reinforcing portion does not contact the array body. This structure suppresses occurrence of short circuit due to contact of the array body and the reinforcing portion.

Advantageous Effects of Invention

The present invention improves the strength of the middle plate against a shear load, while securing insulation between the battery cells and the joining member.

BRIEF DESCRIPTION OF DRAWINGS

FIG. 2(a) is a perspective view illustrating a battery cell held in a cell holder according to the first embodiment, and FIG. 2(b) is a perspective view illustrating the cell holder according to the first embodiment.

FIG. 3(a) is a diagram of a middle plate according to the first embodiment as viewed from an array body side, and FIG. 3(b) is a diagram of the middle plate according to the first embodiment as viewed from an elastic member side.

FIG. 9(a) is a front view of a reinforcing portion of a middle plate according to the second embodiment as viewed from the elastic member side, and FIG. 9(b) is a front view of the reinforcing portion of the middle plate according to the second embodiment as viewed from the array body side.

FIG. 10(a) is a front view of an insulating portion of the middle plate according to the second embodiment as viewed from the elastic member side, and FIG. 10(b) is a front view of the insulating portion of the middle plate according to the second embodiment as viewed from the array body side.

DESCRIPTION OF EMBODIMENTS

Figure 1:
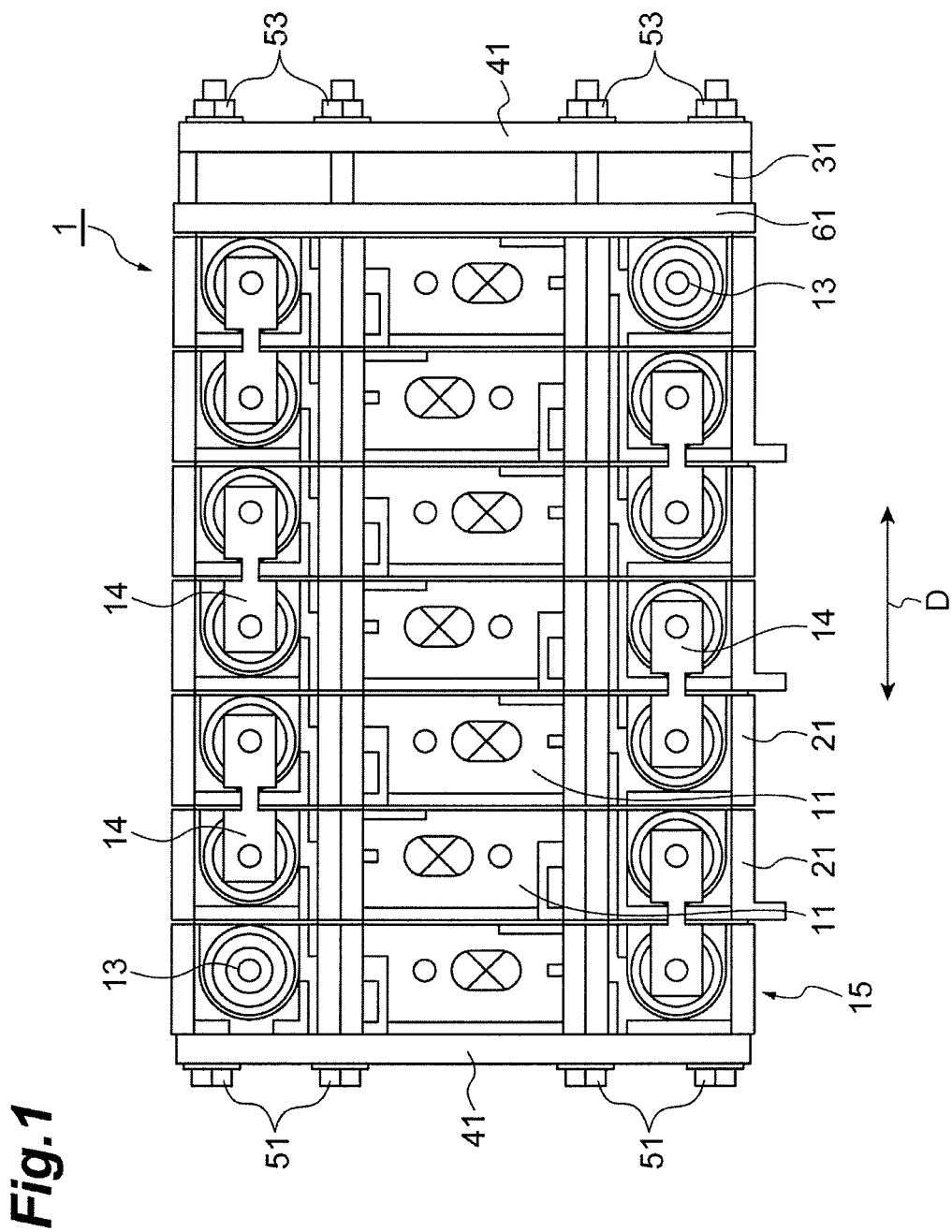
FIG. 1 is a plan view illustrating a battery module according to a first embodiment.

A first embodiment will now be explained with reference to attached drawings. In the explanations of the drawings, the same or corresponding elements are assigned with the same reference signs, and redundant explanations thereof are omitted. The dimensions and their ratios in the drawings do not necessarily match those mentioned in the explanations. Furthermore, in the explanation, the terms indicating directions such as "top" and "bottom" are based on the configuration illustrated in the drawings, and are used merely for convenience sake.

First Embodiment

Figure 4:
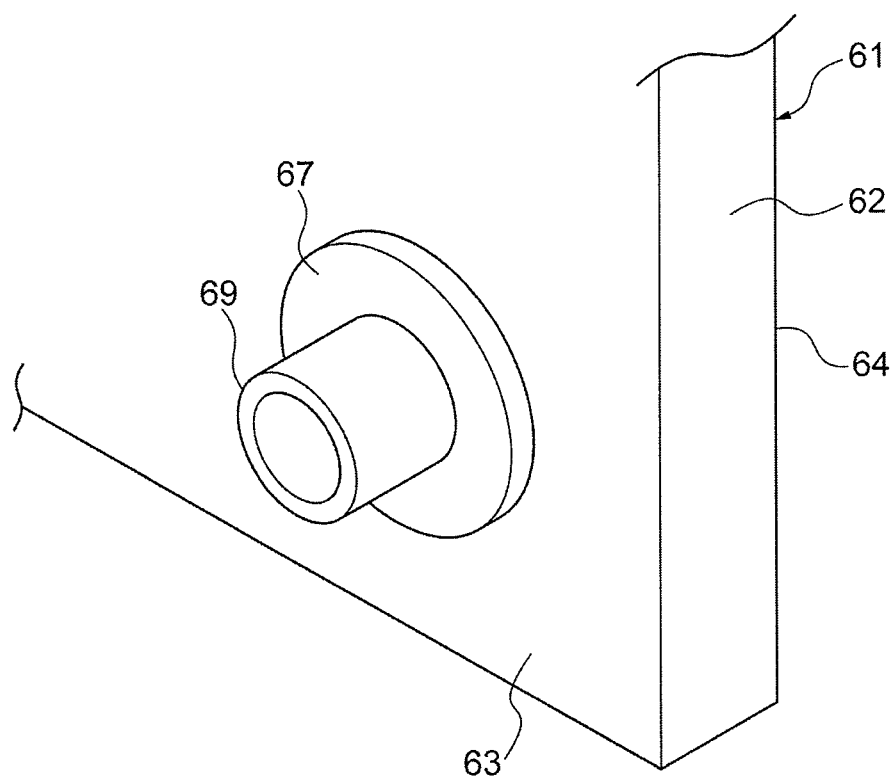
FIG. 4 is an enlarged perspective view illustrating part of the middle plate according to the first embodiment.
Figure 5:
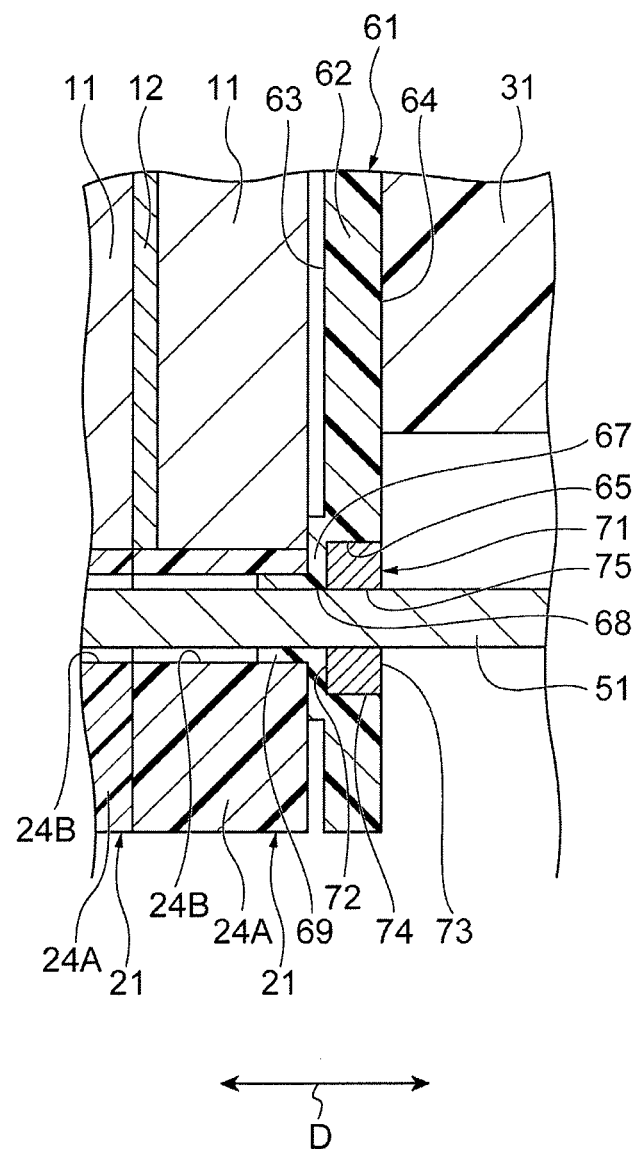
FIG. 5 is a cross-sectional view illustrating the middle plate and therearound in an assembled state according to the first embodiment.

FIG. 1 is a plan view illustrating a battery module. FIG. 2(a) is a perspective view illustrating a battery cell held in a cell holder, and FIG. 2(b) is a perspective view illustrating the cell holder. FIG. 3(a) is a diagram of a middle plate as viewed from an array body side, and FIG. 3(b) is a diagram of the middle plate as viewed from an elastic member side. In FIG. 3(a) and FIG. 3(b), the external shape position of the elastic member 31 is indicated with broken lines. FIG. 4 is an enlarged perspective view illustrating part of the middle plate, and FIG. 5 is a cross-sectional view illustrating the middle plate and therearound in an assembled state. The battery module 1 illustrated in FIG. 1 is used in a state in which, for example, a plurality of battery modules 1 are contained in a housing and serve as a battery pack.

As illustrated in FIG. 1, the battery module 1 includes an array body 15 in which a plurality of battery cells 11 held in respective cell holders 21 are arrayed, an elastic member 31 disposed on one side (right side in FIG. 1) of an array direction D (lateral direction in FIG. 1) of the array body 15, a pair of end plates 41 arranged on both sides of the array direction D with respect to the array body 15 and the elastic member 31, a plurality of bolts 51 (joining member) joining the pair of end plates 41 each other, and a middle plate 61 disposed between the array body 15 and the elastic member 31.

The battery cell 11 is a battery formed by containing an electrode assembly in a case having a rectangular box shape, for example, a nonaqueous electrolyte secondary battery, such as a lithium ion secondary battery. In this example, seven battery cells 11 are arrayed. The battery cells 11 are arrayed in a state of being held in respective cell holders 21. The adjacent battery cells 11 are in close contact with each other via a heat transfer plate 12 (see FIG. 5). Electrode terminals 13 of the adjacent battery cells 11 are mutually electrically connected with a bus bar 14. In this manner, the adjacent battery cells 11 are electrically connected in series. The array body 15 is formed of the battery cells 11, the cell holders 21, the heat transfer plates 12, and the bus bars 14.

Each of the cell holders 21 is formed of resin. As illustrated in FIG. 2(a) and FIG. 2(b), each cell holder 21 includes a frame portion 22 and a partition portion 23. The frame portion 22 includes a bottom plate 24, and a pair of side plates 25 standing from both ends of the bottom plate 24. Each of both the end portions of the bottom plate 24 is provided with a projecting portion 24A projecting in a thickness direction of the bottom plate 24, and each of the projecting portions 24A is provided with an insertion hole 24B extending in the array direction D. The bolts 51 are inserted through the respective insertion holes 24B.

The partition portion 23 connects the pair of side plates 25. A pair of terminal receiving portions 26 are provided on the partition portion 23. Each of the terminal receiving portions 26 includes a circular internal wall surrounding the respective electrode terminals 13. In addition, a pair of column portions 27 having a prism shape and connected with the respective terminal receiving portions 26 are provided on the partition portion 23. The pair of column portions 27 is provided with insertion holes 27A extending in the array direction D. A diameter of the insertion hole 27A is, for example, the same as the diameter of the insertion hole 24B. The bolts 51 are inserted through the respective insertion holes 27A.

In each of the cell holders 21, a containing space S is formed with the frame portion 22 and the partition portion 23. As illustrated in FIG. 2(a), the battery cell 11 is contained in the containing space S. In this manner, the battery cell 11 is held in the cell holder 21. In addition, in each of the cell holders 21, a rectangular opening portion 28 is formed with the frame portion 22 and the lower end surface of the partition portion 23 in FIG. 2(b). The opening portion 28 is used for disposing the heat transfer plate 12.

As illustrated in FIG. 1, the elastic member 31 is formed, for example, of rubber in a flat plate shape. The elastic member 31 is disposed between the middle plate 61 and the end plate 41. As illustrated with a broken line in FIG. 3(a) and FIG. 3(b), the planar shape of the elastic member 31 as viewed in the array direction D is, for example, an oblong shape (rectangular shape), and smaller than the external shape of the middle plate 61. The elastic member 31 is mounted on the middle plate 61 with engaging means that is not illustrated. In this manner, the elastic member 31 is positioned with respect to the array body 15, in the direction orthogonal to the array direction D.

Each of the end plates 41 is formed, for example, of metal in a flat plate shape. The pair of end plates 41 hold the array body 15 and the elastic member 31 from both sides in the array direction D, to apply a restraint load to the array body 15 and the elastic member 31. Each of the end plates 41 is provided with a plurality of (four in this example) through holes to insert the bolts 51 therethrough.

Each of the bolts 51 is formed, for example, of iron-based metal with relatively high strength. A plurality of (four in this example) bolts 51 are provided, to extend in the array direction D and join the pair of end plates 41. The bolts 51 are inserted through the respective through holes of the pair of end plates 41, and inserted through the insertion holes 24B or the insertion holes 27A described above. In addition, the bolts 51 are fastened with nuts 53 to outside of one of the end plates 41. The fastening applies a restraint load to the array body 15 and the elastic member 31. The bolts 51 are also inserted through respective through holes 65 of the middle plate 61 described later.

The middle plate 61 includes, for example, a main body portion 62 formed of resin in a flat plate shape. The main body portion 62 is interposed between the array body 15 and the elastic member 31. This structure suppresses variation of the load applied from the elastic member 31 to the array body 15. In the first embodiment, the planar shape of the main body portion 62 as viewed in the array direction D is, for example, a rectangular shape as illustrated in FIG. 3(a) and FIG. 3(b), and is the same shape as the end plates 41.

As illustrated in FIG. 3(b), the main body portion 62 is provided with four through holes 65 to insert the bolts 51 therethrough. The four through holes 65 are arranged in a bilateral symmetrical manner. More specifically, in the main body portion 62, the through holes 65 are provided outside a region serving as a surface contacting the elastic member 31, and two of the through holes 65 are arranged in each of the upper portion and the lower portion in FIG. 3(a) and FIG. 3(b). The lower two through holes 65 are arranged in respective lower corner portions of the main body portion 62. The upper two through holes 65 are arranged in a left portion and a right portion with a space narrower than the lateral space between the lower two through holes 65.

Metal collars 71 are inserted through the respective through holes 65, and the bolts 51 are inserted through the metal collars 71. The metal collars 71 are formed, for example, of iron-based metal with relatively high strength that is the same as the bolts 51. As illustrated in FIG. 3(b), each of the metal collars 71 is formed in, for example, a disc shape, and includes a circular insertion hole 75 in the center thereof. The external diameter of each of the metal collars 71 is substantially the same as the diameter of the through hole 65 such that the metal collars 71 can be fitted into and inserted through the respective through holes 65. In addition, the diameter of each of the insertion holes 75 is the same as, or slightly larger than, the diameter of the bolts 51 such that the bolts 51 can be inserted through the respective insertion holes 75.

As illustrated in FIG. 5, the thickness of each of the metal collars 71 is the same as the thickness of the main body portion 62, in this example. In this manner, one (on the array body 15 side) end surface 72 of each metal collar 71 is flush with the opposed surface 63 of the main body portion 62 opposed to the array body 15, and the other (on the elastic member 31 side) end surface 73 of each metal collar 71 is flush with the opposed surface 64 of the main body portion 62 opposed to the elastic member 31. In addition, although not illustrated, in this example, an external circumferential surface 74 of each metal collar 71 is subjected to, for example, knurling to form projections and depressions.

As illustrated in FIG. 3(a), FIG. 4, and FIG. 5, in the main body portion 62, the opposed surface 63 opposed to the array body 15 is provided with shield portions 67 to shield the end surfaces 72 of the metal collars 71. The planar shape of each of the shield portions 67 as viewed in the array direction D is a disc shape with an external diameter larger than the diameter of the insertion holes 75. In addition, the center of each of the shield portions 67 is provided with an insertion hole 68 having, for example, the same shape as that of the insertion holes 75. As viewed in the array direction D, the center of the insertion hole 68 agrees with the center of the insertion hole 75. Each of the shield portions 67 is connected with the main body portion 62 through the circumferential direction in the radial outside, to shield the whole end surface 72 of the metal collar 71.

In addition, the opposed surface 63 of the main body portion 62 is provided with cylindrical portions 69 connecting to the respective shield portions 67. Each of the cylindrical portions 69 is formed in a cylindrical shape. Each of the cylindrical portions 69 is inserted through the insertion hole 24B or 27A of the cell holder 21, as described later with reference to FIG. 5. The internal diameter of each of the cylindrical portions 69 is the same as the diameter of each of the insertion holes 75. As viewed in the array direction D, the center of the cylindrical portion 69 agrees with the center of the insertion hole 75. The external diameter of each of the cylindrical portions 69 is the same as, or slightly smaller than the diameters of the insertion holes 24B and the insertion holes 27A such that the cylindrical portions 69 can be inserted through the insertion holes 24B and the insertion holes 27A.

The middle plate 61 in which the metal collars 71 are inserted through the respective through holes 65 as described above is formed by, for example, insert molding. Specifically, in manufacturing, metal collars 71 are arranged in predetermined positions in cavities formed between a pair of molds, and thereafter molten resin is filled into the cavities. Thereafter, the filled resin is solidified, to obtain the middle plate 61. Accordingly, in this example, the main body portion 62, the shield portions 67, and the cylindrical portions 69 are formed as one unitary piece.

Assembly of the battery module 1 will be explained with reference to FIG. 5. In assembly, the bolts 51 are inserted through the insertion holes 75 of the metal collars 71, the insertion holes 68 of the shield portions 67, and the cylindrical portions 69. In addition, the bolts 51 are inserted through the insertion holes 24B of the cell holders 21. The cylindrical portions 69 are inserted through the insertion holes 24B together with the bolts 51. Specifically, in assembly, the cylindrical portions 69 are inserted through the insertion holes 24B, to position the middle plate 61 and the cell holders 21, and thereafter the bolts 51 are inserted through both the cylindrical portions 69 and the insertion holes 24B. In the same manner, the cylindrical portions 69 are inserted also through the insertion holes 27A together with the bolts 51.

The following is explanation of advantageous effects of the battery module 1 explained above. As illustrated in FIG. 5, in the battery module 1, the middle plate 61 contacts both the battery cell 11 and the bolt 51. With respect to this point, because the middle plate 61 is formed of resin, the battery module 1 secures insulation between the battery cell 11 and the bolt 51. In addition, because the metal collars 71 are inserted through the through holes 65 of the middle plate 61, the metal collars 71 are capable of receiving a shear load. This structure improves strength of the middle plate 61 against a shear load. Accordingly, the battery module 1 enables improvement in strength of the middle plate 61 against a shear load, while securing insulation between the battery cells 11 and the bolts 51.

As illustrated in FIG. 5, in the battery module 1, the metal collar 71 is separated from the battery cell 11 with the shield portion 67. Specifically, the shield portion 67 increases a distance (insulation distance) between the metal collar 71 and the battery cell 11. Accordingly, the battery module 1 secures insulation between the metal collar 71 and the battery cell 11. In addition, in the battery module 1, the cylindrical portion 69 separates the bolt 51 from the battery cell 11, as illustrated in FIG. 5. Specifically, the cylindrical portion 69 increases a distance (insulation distance) between the bolt 51 and the battery cell 11. Accordingly, the battery module 1 secures insulation between the bolt 51 and the battery cell 11.

In the battery module 1, as described above, in assembly, the cylindrical portions 69 are inserted through the insertion holes 24B or the insertion holes 27A of the cell holder 21. Accordingly, the battery module 1 improves assembly property, because the middle plate 61 and the cell holder 21 can be easily positioned by inserting the cylindrical portions 69 through the insertion holes 24B or the insertion holes 27A in assembly.

In the battery module 1, the end surface 73 of the metal collar 71 is flush with the opposed surface 64 of the main body portion 62 opposed to the elastic member 31. When the metal collar 71 projects from the main body portion 62, when a shear load acts on the middle plate 61, the load concentrates on the projecting portion, and the middle plate 61 may be broken in the portion. With respect to this point, the battery module 1 avoids such concentration of the load.

In the battery module 1, the external circumferential surfaces 74 of the metal collars 71 are subjected to knurling, to form projections and depressions. This structure prevents the metal collars 71 from easily falling out of the through holes 65. Accordingly, this structure suppresses breakage of the middle plate 61 due to falling of the metal collars 71. In addition, in the battery module 1, the metal collars 71 are formed of iron-based metal with relatively high strength, in the same manner as the bolts 51. This structure suppresses damage due to wear with the bolts 51 in the metal collars 71.

Figure 6:
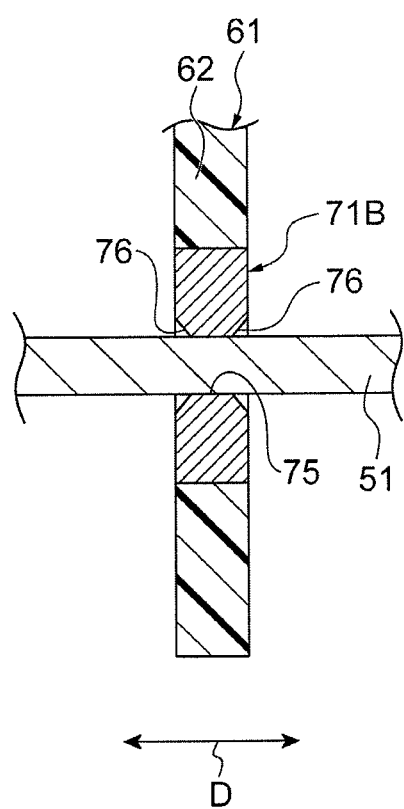
FIG. 6 is a cross-sectional view illustrating the middle plate and a metal collar according to a first modification.

The following is explanation of modifications. FIG. 6 is a cross-sectional view illustrating the middle plate and the metal collar according to a first modification. Each of metal collars 71B according to the first modification is different from the metal collars 71 according to the first embodiment described above, in that chamfered surfaces 76 are formed in the insertion hole 75. FIG. 6 illustrates a state in which the shield portion 67 and the cylindrical portion 69 are omitted. The chamfered surfaces 76 are formed by chamfering opening edges on both sides of the insertion hole 75 in the array direction D. The chamfered surfaces 76 extend in a direction crossing the array direction D.

In the battery module 1, the battery cells 11 may expand in the array direction D due to deterioration or overcharge. When the battery cells 11 swell, the array body 15 expands to the elastic member 31 side due to swelling of the battery cells 11, and the middle plate 61 is pressed and displaced toward the elastic member 31 side. In this state, the middle plate 61 slides to move with respect to the bolts 51.

With respect to this point, with the metal collar 71B according to the modification, the chamfered surfaces 76 are formed in both end portions of the metal collar 71B in the array direction D serving as the portion contacting the bolt 51 in the middle plate 61. This structure suppresses damage to the bolt 51 at the time when the battery cell 11 expands and the middle plate 61 slides to move with respect to the bolt 51.

Figure 7:
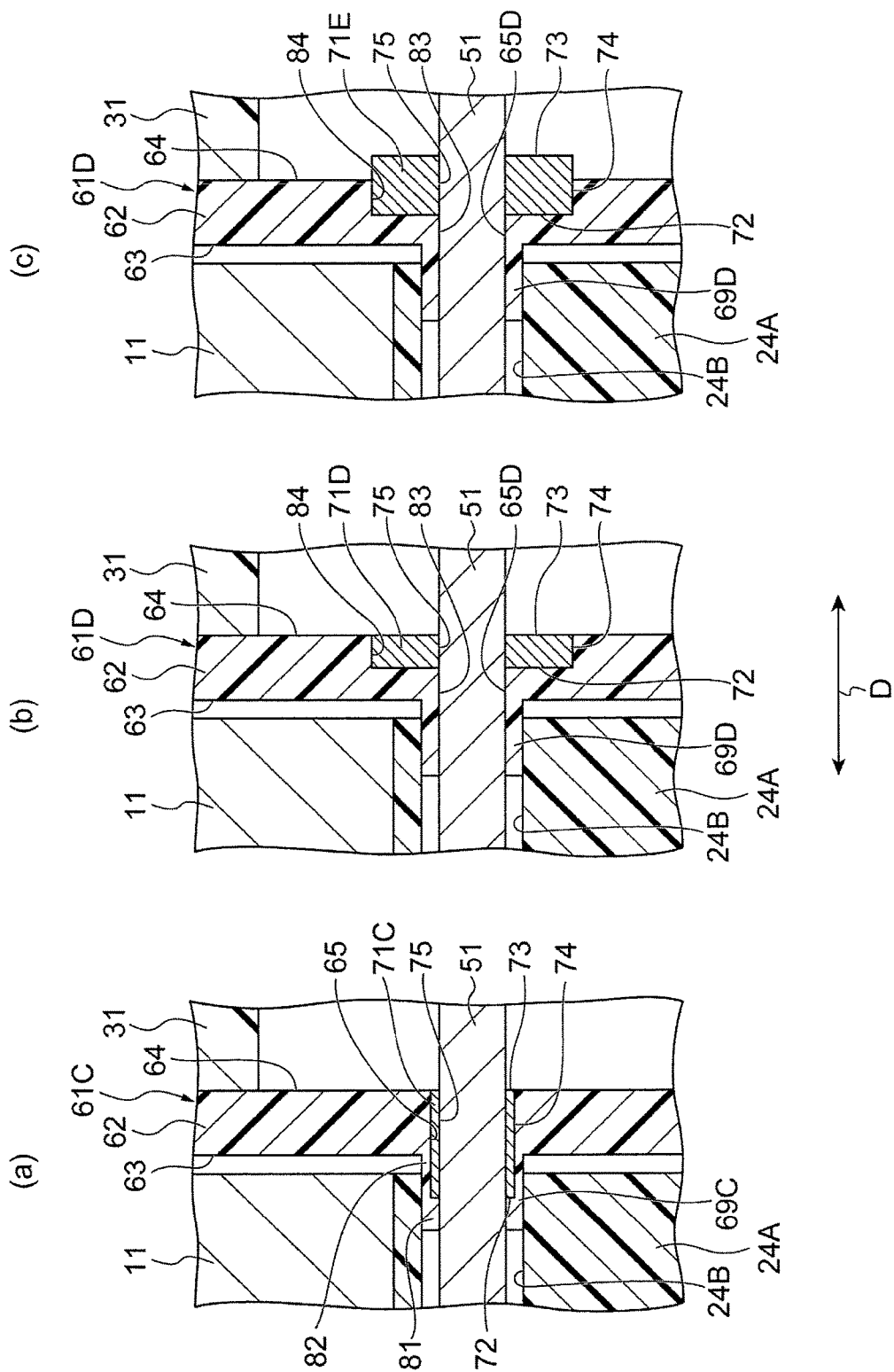
FIG. 7(a) to FIG. 7(c) are cross-sectional views illustrating the middle plates and the metal collars according to second to fourth modifications.

FIG. 7(a) to FIG. 7(c) are cross-sectional views illustrating middle plates and metal collars according to second to fourth embodiments. A middle plate 61C according to the second modification illustrated in FIG. 7(a) is provided with a cylindrical portion 69C connecting to the opposed surface 63 of the main body portion 62, instead of the structure of the shield portion 67. The cylindrical portion 69C includes a first portion 81 having an external diameter and an internal diameter that are the same as those of the cylindrical portion 69 according to the first embodiment, and a second portion 82 connecting to the first portion 81 and the opposed surface 63. The external diameter of the second portion 82 is the same as that of the first portion 81, and the internal diameter of the second portion 82 is larger than the first portion 81 by the radial thickness of the metal collar 71C. The second portion 82 communicates with the through hole 65.

The external diameter of the metal collar 71C of the second embodiment is smaller than the external diameter of the cylindrical portion 69C. The thickness of the metal collar 71C in the array direction D is larger than the thickness of the main body portion 62 in the array direction D. The end surface 72 of the metal collar 71C projects to the battery cell 11 (array body 15) side beyond the opposed surface 63 of the main body portion 62. The projecting portion is inserted through the second portion 82 of the cylindrical portion 69C, together with the bolt 51. The end surface 73 of the metal collar 71C is flush with the opposed surface 64 of the main body portion 62.

Also according to the second modification described above, the metal collar 71C is inserted through the through hole 65, in the same manner as the first embodiment described above. This structure enables improvement in strength of the middle plate 61 against a shear load, while securing insulation between the battery cell 11 and the bolt 51. In addition, the external circumferential surface (part of the external circumferential surface 74) of the projecting portion is shielded with the second portion 82, and the end surface 72 of the metal collar 71C is shielded with the first portion 81. Accordingly, the cylindrical portion 69C also functions as a shield portion securing insulation between the metal collar 71C and the battery cell 11. In addition, because part of the metal collar 71C is disposed in the cylindrical portion 69C, the strength of the cylindrical portion 69C is secured.

A middle plate 61D according to the third modification illustrated in FIG. 7(b) is also provided with a cylindrical portion 69D connecting to the opposed surface 63 of the main body portion 62, instead of the structure of the shield portion 67. The cylindrical portion 69D has an external diameter and an internal diameter that are the same as those of the cylindrical portion 69 according to the first embodiment described above. The thickness of the metal collar 71D in the array direction D according to the third modification is smaller than the thickness of the main body portion 62. A through hole 65D of the middle plate 61D according to the third modification includes a first portion 83 communicating with the cylindrical portion 69D, and a second portion 84 having a diameter larger than that of the first portion 83. The bolt 51 is inserted into the second portion 84, and the metal collar 71D is also inserted into the second portion 84. The end surface 73 of the metal collar 71D is flush with the opposed surface 64 of the main body portion 62.

Also according to the third modification as described above, the metal collar 71D is inserted into the through hole 65D, in the same manner as the first embodiment described above. This structure enables improvement in strength of the middle plate 61 against a shear load, while securing insulation between the battery cell 11 and the bolt 51. In addition, the end surface 72 of the metal collar 71D is shielded with a portion of the main body portion 62 on the battery cell 11 side beyond the second portion 84, and the cylindrical portion 69D. Accordingly, the portion and the cylindrical portion 69D also function as the shield portion securing insulation between the metal collar 71D and the battery cell 11.

A metal collar 71E according to a fourth modification illustrated in FIG. 7(c) has a larger thickness in the array direction D than that of the metal collar 71D according to the third modification described above. The end surface 73 of the metal collar 71E projects toward the elastic member 31 side beyond the opposed surface 64 of the main body portion 62. The other points are the same as those of the third modification described above, and description thereof is omitted. Also according to the fourth modification described above, the metal collar 71E is inserted through the through hole 65D, in the same manner as the first embodiment described above. This structure enables improvement in strength of the middle plate 61 against a shear load, while securing insulation between the battery cell 11 and the bolt 51. However, the structure in which the end surface 73 is flush with the opposed surface 64 is more preferable in respect of avoiding concentration of a load on the projecting portion, as described above.

The present invention is not limited to the first embodiment that has been described above, but may be modified within the range not changing the gist recited in the claims, or may be applied to another one.

For example, the metal collar 71 is inserted through the through hole 65 of the middle plate 61 in the first embodiment described above, but the metal collar 71 is not necessarily inserted. In such a case, the diameter of the through hole 65 is set to a diameter equal to, or slightly larger than, the diameter of the bolt 51, and the opposed surface 63 of the middle plate 61 is provided with the cylindrical portion 69 to communicate with the through hole 65. Also with this structure, the middle plate 61 is formed of resin, in the same manner as the first embodiment described above. This structure also secures insulation between the battery cell 11 and the bolt 51. In addition, because the cylindrical portion 69 separates the battery cell 11 from the bolt 51, this structure secures insulation between the battery cell 11 and the bolt 51. In addition, providing the cylindrical portion 69 increases the thickness around the through hole 65 in the middle plate 61, and improves strength of the middle plate 61 against a shear load.

In addition, the elastic member 31 is disposed on one side in the array direction D in the first embodiment described above, but it suffices that the elastic member 31 is disposed on at least one side, and the elastic member 31 may be disposed on both sides. However, disposing the elastic member 31 on both sides is more preferable in respect of further allowing expansion of the battery cell 11. The first embodiment described above has been explained with the structure in which the middle plate 61 in which the metal collar 71 is inserted through the through hole 65 is formed by insert molding, but the metal collar 71 may be inserted through the through hole 65 after molding of the middle plate 61, and the main body portion 62, the shield portion 67, and the cylindrical portion 69 may be connected and united by, for example, bonding or junction. However, forming the portions together by insert molding is more preferable in that the step of inserting the metal collar 71 can be omitted. The metal collar 71 may be formed of, for example, brass.

Second Embodiment

Figure 8:
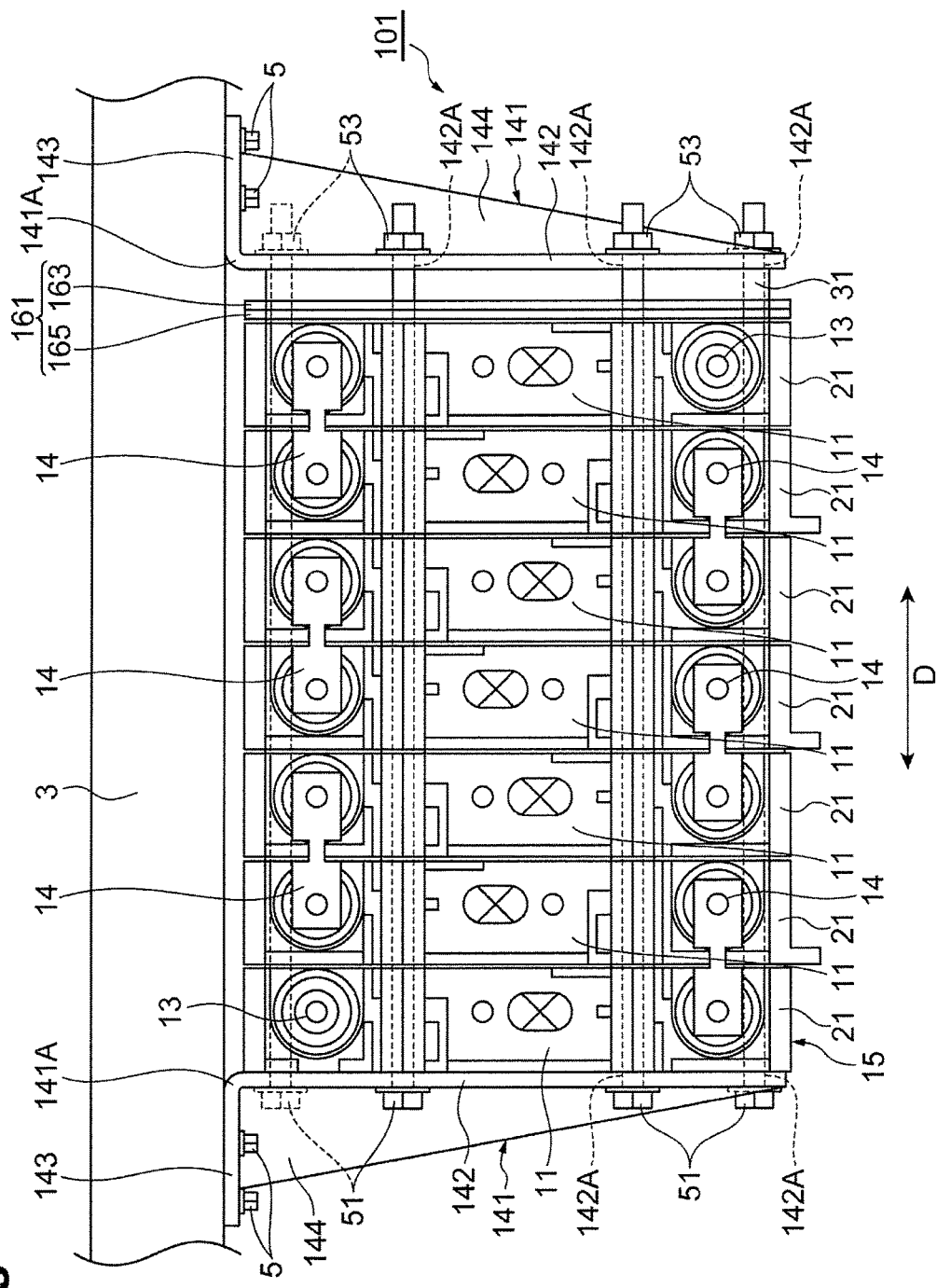
FIG. 8 is a plan view illustrating a battery module according to a second embodiment.

As illustrated in FIG. 8, the battery module 101 includes an array body 15 in which a plurality of battery cells 11 held in respective cell holders 21 are arrayed, the elastic member 31 disposed on one side (right side in FIG. 8) of the array direction D (lateral direction in FIG. 8) of the array body 15, a pair of brackets (end plates) 141 arranged on both sides of the array direction D with respect to the array body 15 and the elastic member 31, a plurality of bolts 51 (joining member) joining the pair of brackets 141 each other, and a middle plate 161 disposed between the array body 15 and the elastic member 31.

The structure of connecting the battery cells 11 each other and the structure of the cell holders 21 are the same as those in the first embodiment described above, and they are denoted with the same reference numerals, and explanations thereof are omitted.

The pair of brackets 141 hold the array body 15 and the elastic member 31 from both sides in the array direction D, to apply a restraint load to the array body 15 and the elastic member 31, and fix the battery module 101 with respect to the wall portion 3 of the housing of the battery pack.

Each of the brackets 141 is formed by bending a plate-shaped member formed of a metal material. Each of the brackets 141 has a structure in which a holding portion 142 and a fixed portion 143 are formed to hold a bent portion 141A therebetween. The holding portion 142 is a portion to hold the array body 15 via the elastic member 31 and the middle plate 161. The fixed portion 143 is a portion fixed onto the wall portion 3 of the housing, and fixed onto the wall portion 3 of the housing with, for example, the bolts 51. Each of the brackets 141 is provided with a rib 144 to increase strength. Each of the brackets 141 is provided with a plurality of (four in this example) insertion holes 142A to insert the bolts 51 therethrough.

The bolts 51 are formed of, for example, an iron-based metal with relatively high strength. A plurality of (four in this example) bolts 51 are provided, to extend in the array direction D to join the pair of brackets 141 each other. The bolts 51 are inserted through the respective insertion holes 142A of the pair of brackets 141, and inserted through the insertion holes 24B or the insertion holes 27A of the cell holders 21. The bolts 51 are fastened with nuts (joining members) 53 to outside of one of the brackets 141. The fastening applies a restraint load to the array body 15 and the elastic member 31. The bolts 51 are also inserted through first insertion holes 163C and second insertion holes 165C (see FIG. 9(a) and FIG. 10(a)) of the middle plate 161 described later.

As illustrated in FIG. 8, the middle plate 161 is interposed between the array body 15 and the elastic member 31. This structure suppresses variation of the load applied from the elastic member 31 to the array body 15. The middle plate 161 includes a reinforcing portion 163 formed of a metal material (for example, iron (steel) or aluminum) in a flat plate shape, and an insulating portion 165 formed of an insulating material (for example, resin such as polypropylene (PP) resin, polyethylene (PE) resin, and PA66 resin) in a flat plate shape. The reinforcing portion 163 and the insulating portion 165 contact each other. The reinforcing portion 163 is disposed on the elastic member 31 side, and the insulating portion 165 is disposed on the array body 15 side.

The following is further detailed explanation of the middle plate 161, with reference to FIG. 9(*a*), FIG. 9(*b*), FIG. 10(*a*), and FIG. 10(*b*). FIG. 9(*a*) is a front view of the reinforcing portion 163 of the middle plate 161 as viewed from the elastic member 31 side, and FIG. 9(*b*) is a front view of the reinforcing portion 163 of the middle plate 161 as viewed from the array body 15 side. FIG. 10(*a*) is a front view of the insulating portion 165 of the middle plate 161 as viewed from the elastic member 31 side, and FIG. 10(*b*) is a front view of the insulating portion 165 of the middle plate as viewed from the array body 15 side.

The planar shapes of the reinforcing portion 163 and the insulating portion 165 as viewed from the array direction D are rectangular shapes as illustrated in FIG. 9(*a*) and FIG. 10(*a*), and have the same size and the same shape as that of the bracket 141 as viewed in the array direction D.

The reinforcing portion 163 is provided with four first insertion holes 163C to insert the bolts 51 therethrough, as illustrated in FIG. 9(*a*). The four first insertion holes 163C are arranged in a bilateral symmetrical manner. More specifically, the first insertion holes 163C are provided outside a region serving as a surface contacting the elastic member 31, and two of the first insertion holes 163C are arranged in each of the upper portion and the lower portion in FIG. 9(*a*). The lower two first insertion holes 163C are arranged in respective lower corner portions of the reinforcing portion 163. The upper two first insertion holes 163C are arranged in an upper portion of the reinforcing portion 163 with a space narrower than the lateral space between the lower two first insertion holes 163C.

The reinforcing portion 163 includes a first surface 163A contacting the elastic member 31, and a second surface 163B opposed to the insulating portion 165. As illustrated in FIG. 9(*b*), the second surface 163B of the reinforcing portion 163 is provided with first cylindrical portions 164 projected to the insulating portion 165 side. Inner space portions 164A of the first cylindrical portions 164 communicate with the respective first insertion holes 163C. The second surface 163B of the reinforcing portion 163 is provided with projections 171 projected to the insulating portion 165 side. In assembly of the battery module 101, the projections 171 are fitted into depressions 173 formed in a first surface 165A of the insulating portion 165 described in detail in the later paragraph.

The insulating portion 165 is provided with four second insertion holes 165C to insert the bolts 51 therethrough, as illustrated in FIG. 10(*a*). An internal diameter D2 of each of the second insertion holes 165C is larger than an internal diameter D1 of each of the first insertion holes 163C (see FIG. 11). The four second insertion holes 165C are arranged in a bilateral symmetrical manner. More specifically, the second insertion holes 165C are provided to correspond to the positions of the respective first insertion holes 163C when the reinforcing portion 163 is superimposed thereon, and two of the second insertion holes 165C are arranged in each of the upper portion and the lower portion in FIG. 10(*a*). The lower two second insertion holes 165C are arranged in respective lower corner portions of the insulating portion 165. The upper two second insertion holes 165C are arranged in an upper portion of the insulating portion 165 with a space narrower than the lateral space between the lower two second insertion holes 165C.

The insulating portion 165 includes a first surface 165A opposed to the reinforcing portion 163, and a second surface 165B contacting the array body 15. As illustrated in FIG. 10(*b*), the second surface 165B of the insulating portion 165 is provided with second cylindrical portions 166 projected to the array body 15 side. Inner space portions 166A of the second cylindrical portions 166 communicate with the respective second insertion holes 165C. The first surface 165A of the insulating portion 165 is provided with depressions 173. In assembly of the battery module 101, the depressions 173 are fitted with projections 171 formed in the second surface 163E of the reinforcing portion 163 described above.

Figure 11:
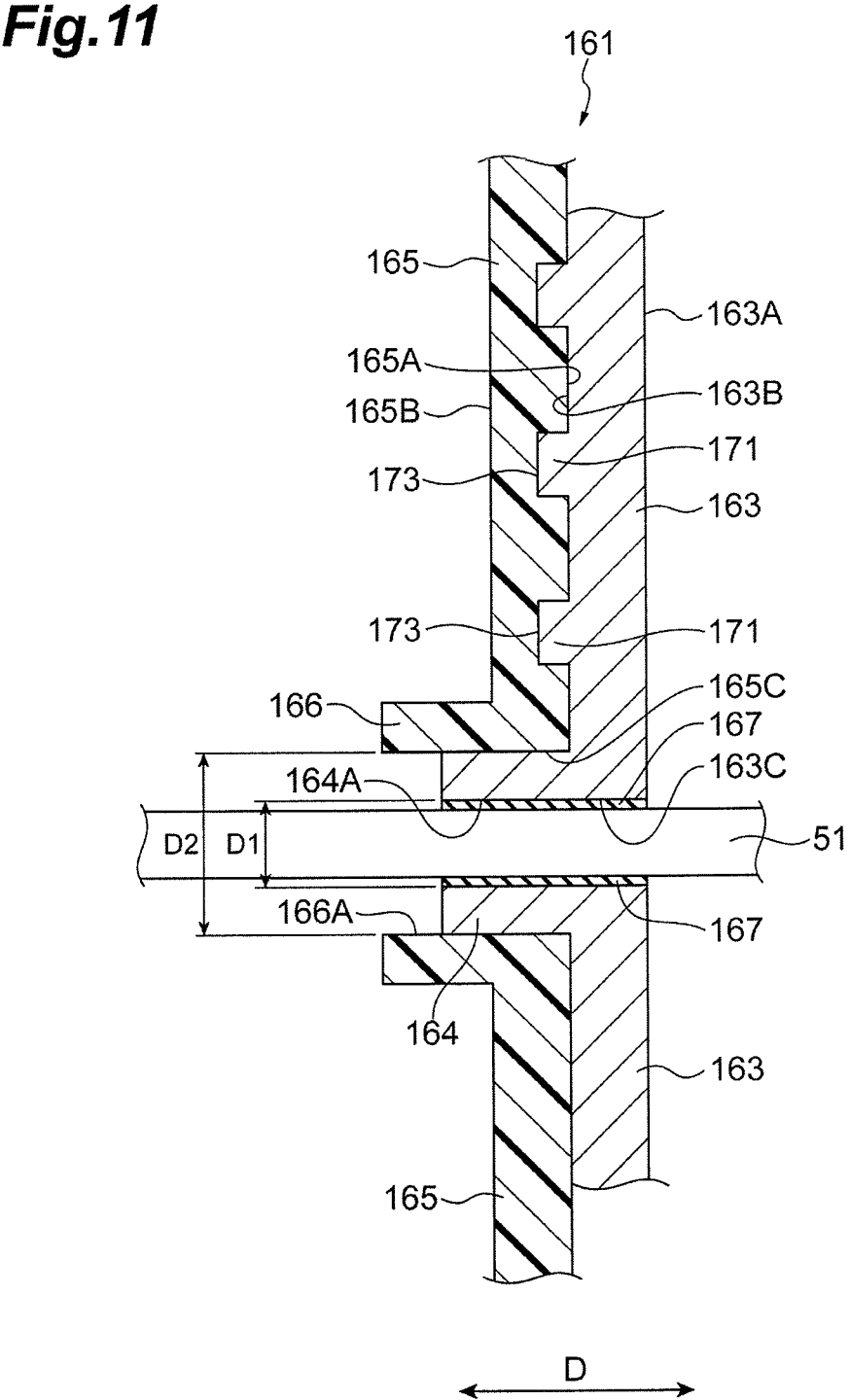
FIG. 11 is an enlarged cross-sectional view illustrating part of the middle plate in an assembled state according to the second embodiment.

Assembly of the battery module 101 will be explained with reference to FIG. 11. As illustrated in FIG. 11, when the battery module 101 is assembled, bolts 51 are inserted through the first insertion holes 163C of the reinforcing portion 163, the inner space portions 164A of the first cylindrical portions 164 of the reinforcing portion 163, the second insertion holes 165C of the insulating portion 165, and the second cylindrical portions 166 of the insulating portion 165. The first cylindrical portions 164 of the reinforcing portion 163 are inserted together with the bolts 51 through the second insertion holes 165C of the insulating portion 165. In addition, the depressions 173 of the insulating portion 165 are fitted with the projections 171 of the reinforcing portion 163. Specifically, when the battery module 101 is assembled, the first cylindrical portions 164 of the reinforcing portion 163 are inserted through the second insertion holes 165C of the insulating portion 165, and the depressions 173 of the insulating portion 165 are fitted with the projections 171 of the reinforcing portion 163. In this manner, the reinforcing portion 163 and the insulating portion 165 are positioned. Thereafter, the bolts 51 are inserted through both the reinforcing portion 163 and the insulating portion 165. At the time, an insulating member 167 is disposed between the internal circumferential surface of the first insertion hole 163C and the external circumferential surface of the bolt 51.

Simultaneously, the bolts 51 are inserted through the insertion holes 24B of the cell holders 21. The second cylindrical portions 166 are inserted together with the bolts 51 through the insertion holes 24B of the cell holders 21. Specifically, when the battery module 101 is assembled, the second cylindrical portions 166 of the insulating portion 165 are inserted through the insertion holes 24B of the cell holders 21, to position the insulating portion 165 of the middle plate 161 and the cell holders 21. Thereafter, the bolts 51 are inserted through both the inner space portions 166A of the second cylindrical portions 166 and the insertion holes 24B. In the same manner, the second cylindrical portions 166 of the insulating portion 165 are inserted together with the bolts 51 through the insertion holes 27A of the cell holders 21.

The following is explanation of advantageous effects of the battery module 101 explained above. As illustrated in FIG. 8, in the battery module 101 according to the second embodiment described above, because the reinforcing portion 163 formed of a metal material is disposed as part of the middle plate 161, the strength of the whole middle plate 161 is improved. In addition, the insulating portion 165 formed of an insulating material is disposed as part of the middle plate 161 between the array body 15 and the bracket 141. This structure secures insulation between the array body 15 in which a plurality of battery cells 11 are arrayed and the bracket 141. As a result, this structure provides the battery module 101 with excellent durability, while securing insulation between the array body 15 formed of the battery cells 11 and the bracket 141.

In addition, in the battery module 101, because the internal diameter D1 of each of the first insertion holes 163C is formed smaller than the internal diameter D2 of the second insertion holes 165C, the bolts 51 inserted through the first insertion holes 163C and the second insertion holes 165C contact only the reinforcing portion 163 provided with the first insertion holes 163C having the smaller internal diameter. This structure suppresses occurrence of damage in the first insertion holes 163C and the second insertion holes 165C through which the bolts 51 are inserted.

In the battery module 101, because the first cylindrical portions 164 projecting from the reinforcing portion 163 to the insulating portion 165 side are inserted through the second insertion holes 165C of the insulating portion 165, movement of the insulating portion 165 with respect to the reinforcing portion 163 is restrained. This structure suppresses displacement of the position of the insulating portion 165 from the predetermined position. Consequently, this structure suppresses short circuit caused by contact between the array body 15 and the reinforcing portion 163.

In the battery module 101, the reinforcing portion 163 and the insulating portion 165 are mutually fitted with the depressions 173 and the projections 171 formed on the respective opposed surfaces of the reinforcing portion 163 and the insulating portion 165 (the second surface 163B of the reinforcing portion 163 and the first surface 165A of the insulating portion). This structure restricts the movement of the insulating portion 165 with respect to the reinforcing portion 163, thereby suppressing the displacement of the position of the insulating portion 165 with respect to the reinforcing portion 163. Consequently, this structure suppresses short circuit caused by contact between the array body 15 and the reinforcing portion 163.

In the battery module 101, among the depressions 173 and the projections 171, the projections 171 are formed in the reinforcing portion 163 formed of a metal material having relatively high strength in comparison with the insulating material. This structure suppresses damage to the projections 171.

In the battery module 101, the insulating member 167 is disposed between the internal circumferential surface of the first insertion hole 163C and the external circumferential surface of the bolt 51. This structure prevents short circuit of the array body 15 and the reinforcing portion 163 through the bolt 51.

The present invention is not limited to the second embodiment that has been explained above, but may be variously modified within a range not departing from the gist of the invention.

The second embodiment described above illustrates the example in which the planar shapes of the reinforcing portion 163 and the insulating portion 165 as viewed in the array direction D have the same size and the same shape, but the present invention is not limited thereto. For example, as illustrated in a fifth modification illustrated in FIG. 12, the planar shapes of a reinforcing portion 263 and an insulating portion 265 as viewed in the array direction D may be formed such that the area (first area) of a surface 263A of the reinforcing portion 263 as viewed in the array direction D is narrower than the area (second area) of a surface 265A of the insulating portion 265 as viewed in the array direction D. With the middle plate 261 with this structure, the reinforcing portion 263 does not contact the array body 15, even when the reinforcing portion 263 is slightly displaced from the insulating portion 265. This structure suppresses occurrence of short circuit caused by contact between the array body 15 and the reinforcing portion 263.

Figure 12:
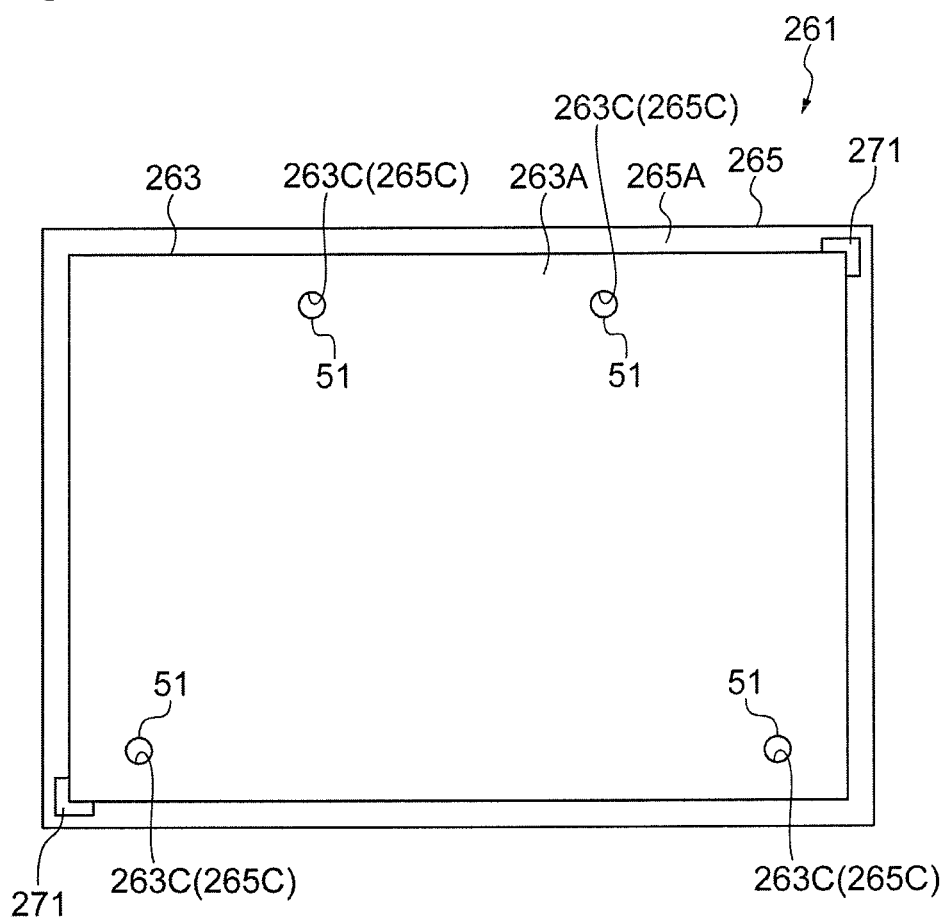
FIG. 12 is a front view of the middle plate according to a fifth modification as viewed from the elastic member side.

In addition, as illustrated in FIG. 12, when the area of the surface 263A of the reinforcing portion 263 as viewed in the array direction D is narrower than the area of the surface 265A of the insulating portion 265 as viewed in the array direction D, the reinforcing portion 263 may be fixed with respect to the insulating portion 265 by the following method. Specifically, a pair of L-shaped projections 271 may be provided in the vicinity of corner portions diagonally positioned in the insulating portion 265, and the reinforcing portion 263 may be fitted into the projections 271. Also in this case, vertical and horizontal movement of the reinforcing portion 263 is restrained with respect to the insulating portion 265. Accordingly, this structure suppresses occurrence of short circuit caused by contact between the array body 15 and the reinforcing portion 263. The projections 271 may be provided in all the corner portions in the insulating portion 265.

The second embodiment described above illustrates the example provided with the depressions 173 and the projections 171 that have rectangular shapes in plan view as viewed in the extending direction of the bolts 51 as illustrated in FIG. 11, but they may have any shapes as long as they can be fitted with each other. In addition, the second embodiment illustrates the example in which the projections 171 are formed in the reinforcing portion 163 and the depressions 173 are formed in the insulating portion 165, but at least one of the depressions and the projections may be formed in the reinforcing portion 163, and at least one of the depressions and the projections may be formed in the insulating portion 165.

The second embodiment described above illustrates the example of the middle plate 161 in which the reinforcing portion 163 and the insulating portion 165 are mutually fitted as illustrated in FIG. 8, but the middle plate 161 may be a middle plate in which the reinforcing portion 163 and the insulating portion 165 are formed as one unitary piece.

The second embodiment described above illustrates the example in which the reinforcing portion 163 is disposed on the elastic member 31 side and the insulating portion 165 is disposed on the array body 15 side in the middle plate 161 as illustrated in FIG. 8, but the insulating portion 165 may be disposed on the elastic member 31 side, and the reinforcing portion 163 may be disposed on the array body 15 side. Also in this case, the insulating portion 165 serving as part of the middle plate is disposed between the array body 15 and the bracket 141. This structure secures insulation between the array body 15 and the bracket 141.

Figure 13:
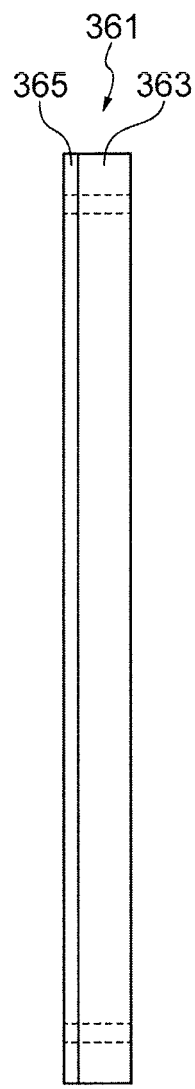
FIG. 13 is a cross-sectional view of the middle plate according to a sixth modification as viewed from a side surface side.

The second embodiment illustrates the example in which the middle plate 161 is formed of two members, that is, the reinforcing portion 163 and the insulating portion 165 as illustrated in FIG. 8, but the present invention is not limited thereto. For example, as illustrated in FIG. 13, a middle plate 361 may have a structure in which resin coating (insulating portion) 365 may be provided on one surface of the reinforcing portion 363 formed of a metal material. Also in this structure, because the middle plate is formed of a metal material, the strength of the whole middle plate is improved. In addition, a coating layer formed of an insulating material is disposed between the reinforcing portion and the array body. This structure secures insulation between the array body in which a plurality of battery cells are arrayed and the end plate. As a result, this structure provides a battery module with excellent durability, while securing insulation between the battery cells and the end plate. It suffices that the resin coating 365 is provided to the middle plate 361 at least on a portion contacting the array body 15. For example, the resin coating 365 may be provided on the whole middle plate 361.

The middle plate according to the sixth modification reduces the number of components, and improves workability in assembly of the battery module. In addition, this structure removes the necessity to provide projections and depressions in the reinforcing portion 163 and/or the insulating portion 165, to secure unity between the reinforcing portion 163 and the insulating portion 165. This structure reduces the number of steps in manufacturing, and reduces the cost.

The second embodiment described above illustrates the example in which the elastic member 31 is disposed on one side in the array direction D as illustrated in FIG. 8, but it suffices that the elastic member 31 is disposed on at least one side, and the elastic member 31 may be disposed on both sides. Disposing the elastic member 31 on both sides is more preferable in that expansion of the battery cell 11 can be further allowed.

The second embodiment described above illustrates the example in which the brackets 141 also function as end plates holding the array body 15 and the elastic member 31 therebetween as illustrated in FIG. 8, but the brackets 141 may be connected to end plates holding the array body 15 and the elastic member 31 therebetween, and brackets to fix the battery module 101 onto the wall portion 3 of the housing of the battery pack may be provided separately.

The middle plates 161, 261, and 361 of the second embodiment, the fifth modification, and the sixth modification may be applied, instead of the middle plate 61 according to the first embodiment described above. In addition, the details (also including the modifications) described as the first embodiment may properly be combined with the details (also including the modifications) as the second embodiment.

REFERENCE SIGNS LIST 1, 101 . . . battery module, 11 . . . battery cell, 15 . . . array body, 21 . . . cell holder, 22 . . . frame portion, 23 . . . partition portion, 24 . . . bottom plate, 24A . . . projecting portion, 24B . . . insertion hole, 25 . . . side plate, 26 . . . terminal receiving portion, 27 . . . column portion, 27A . . . insertion hole, 31 . . . elastic member, 41 . . . end plate, 51 . . . bolt (joining member), 53 . . . nut (joining member), 61, 61C, 61D, 161, 261, 361 . . . middle plate, 62 . . . main body portion, 63 . . . opposed surface, 64 . . . opposed surface, 65, 65D . . . through hole, 67 . . . shield portion, 68 . . . through hole, 69, 69C, 69D . . . cylindrical portion, 71, 71B, 71C, 71D, 71E . . . metal collar, 72 . . . end surface, 73 . . . end surface, 74 . . . external circumferential surface, 75 . . . insertion hole, 76 . . . chamfered surface, 141 . . . bracket (end plate), 163, 263, 363 . . . reinforcing portion, 163C . . . first insertion hole, 164 . . . first cylindrical portion, 164A . . . inner space portion, 165, 265 . . . insulating portion, 165C . . . second insertion hole, 166 . . . second cylindrical portion, 166A . . . inner space portion, 167 . . . insulating member, 171 . . . projection, 173 . . . depression, 271 . . . projection, 365 . . . resin coating (insulating portion), D . . . array direction.

The invention claimed is:

1. A battery module comprising:
an array body in which a plurality of battery cells are arrayed, wherein each of the battery cells is held with a respective cell holder;
an elastic member disposed on at least one side in an array direction of the array body;
a pair of end plates holding the array body and the elastic member therebetween;
a resin middle plate disposed between the array body and the elastic member; and
a metal joining member joining the pair of end plates, wherein
the middle plate is provided with a through hole through which the joining member is inserted,
a metal collar is provided in the through hole, and
the elastic member and the middle plate contact each other,
wherein the metal collar includes an insertion hole having chamfered surfaces.

2. The battery module according to claim 1, wherein, in the middle plate, an opposed surface opposed to the array body is provided with a resin cylindrical portion through which the joining member is inserted.

3. The battery module according to claim 2, wherein each of the cell holders is provided with an insertion hole through which the cylindrical portion is inserted together with the joining member.

4. The battery module according to claim 2, wherein the metal collar is arranged within the resin cylindrical portion.

5. The battery module according to claim 1, wherein the middle plate includes a reinforcing portion formed of a metal material and an insulating portion formed of an insulating material, and the reinforcing portion and the insulating portion contact each other.

6. The battery module according to claim 5, wherein when a first area is an area of a surface orthogonal to an extending direction of the joining member in the reinforcing portion and a second area is an area of a surface orthogonal to an extending direction of the joining member in the insulating portion, the second area is larger than the first area.

7. The battery module according to claim 1, wherein the metal collar is exposed only to the elastic member side.

8. The battery module according to claim 1, wherein the elastic member is disposed on only one side in the array direction of the array body.

9. The battery module according to claim 1, wherein the elastic member is disposed on both sides in the array direction of the array body.

10. The battery module according to claim 1, wherein a thickness of the metal collar is smaller than a thickness of the middle plate.

11. The battery module according to claim 1, wherein a thickness of the metal collar is the same as a thickness of the middle plate, and wherein the metal collar projects toward the elastic member side beyond a surface of the middle plate facing the elastic member.

12. A battery module comprising:
an array body in which a plurality of battery cells are arrayed, wherein each of the battery cells is held with a respective cell holder;
an elastic member disposed on at least one side in an array direction of the array body;
a pair of end plates holding the array body and the elastic member therebetween;
a resin middle plate disposed between the array body and the elastic member; and
a metal joining member joining the pair of end plates, wherein the middle plate is provided with a through hole through which the joining member is inserted, a metal collar is provided in the through hole, and the elastic member and the middle plate contact each other, wherein, in the middle plate, an opposed surface opposed to the array body is provided with a resin shield portion shielding one end surface of the metal collar.

13. A battery module comprising:

an array body in which a plurality of battery cells are arrayed;

an elastic member disposed on at least one side in an array direction of the array body;

a pair of end plates holding the array body and the elastic member therebetween;

a joining member joining the pair of end plates; and a middle plate disposed between the array body and the elastic member, wherein the middle plate includes a reinforcing portion formed of a metal material and an insulating portion formed of an insulating material, the reinforcing portion and the insulating portion contact each other, the joining member is inserted through a first insertion hole formed in the reinforcing portion and a second insertion hole formed in the insulating portion, and an internal diameter of the first insertion hole is smaller than an internal diameter of the second insertion hole.

14. A battery module comprising:

an array body in which a plurality of battery cells are arrayed;

an elastic member disposed on at least one side in an array direction of the array body;

a pair of end plates holding the array body and the elastic member therebetween;

a resin middle plate disposed between the array body and the elastic member; and a metal joining member joining the pair of end plates, wherein the middle plate is provided with a through hole through which the joining member is inserted, a metal collar is inserted through the through hole, and the elastic member and the middle plate contact each other, wherein the middle plate includes a reinforcing portion formed of a metal material and an insulating portion formed of an insulating material, the reinforcing portion and the insulating portion contact each other, the joining member is inserted through a first insertion hole formed in the reinforcing portion and a second insertion hole formed in the insulating portion, and an internal diameter of the first insertion hole is smaller than an internal diameter of the second insertion hole.

15. The battery module according to claim 14, wherein the reinforcing portion is provided with a cylindrical portion projected to the insulating portion side and including an inner space portion communicating with the first insertion hole, and the cylindrical portion is inserted through the second insertion hole.

16. The battery module according to claim 14, wherein an insulating member is disposed between an internal circumferential surface of the first insertion hole and an external circumferential surface of the joining member.

17. A battery module comprising:

an array body in which a plurality of battery cells are arrayed;

an elastic member disposed on at least one side in an array direction of the array body;

a pair of end plates holding the array body and the elastic member therebetween;

a resin middle plate disposed between the array body and the elastic member; and a metal joining member joining the pair of end plates, wherein the middle plate is provided with a through hole through which the joining member is inserted, a metal collar is inserted through the through hole, and the elastic member and the middle plate contact each other, wherein the middle plate includes a reinforcing portion formed of a metal material and an insulating portion formed of an insulating material, the reinforcing portion and the insulating portion contact each other, opposed surfaces in the respective insulating portion and reinforcing portion are provided with a projection and a depression that are projected and depressed in mutually opposite directions, and the insulating portion and the reinforcing portion are mutually fitted with the projection and the depression.

18. The battery module according to claim 17, wherein the projection in the projection and the depression is formed in the reinforcing portion.

19. A battery module comprising:

an array body in which a plurality of battery cells are arrayed;

an elastic member disposed on at least one side in an array direction of the array body;

a pair of end plates holding the array body and the elastic member therebetween;

a joining member joining the pair of end plates; and a middle plate disposed between the array body and the elastic member, wherein the middle plate includes a reinforcing portion formed of a metal material and an insulating portion formed of an insulating material, the reinforcing portion and the insulating portion contact each other, opposed surfaces in the respective insulating portion and reinforcing portion are provided with a projection and a depression that are projected and depressed in mutually opposite directions, and the insulating portion and the reinforcing portion are mutually fitted with the projection and the depression.

20. A battery module comprising:

an array body in which a plurality of battery cells are arrayed, wherein each of the battery cells is held with a respective cell holder;

an elastic member disposed on at least one side in an array direction of the array body;

a pair of end plates holding the array body and the elastic member therebetween;

a resin middle plate disposed between the array body and the elastic member; and a metal joining member joining the pair of end plates, wherein the middle plate is provided with a through hole through which the joining member is inserted, a metal collar is provided in the through hole, and the elastic member and the middle plate contact each other, wherein a thickness of the metal collar is the same as a thickness of the middle plate, and wherein the metal collar projects toward the elastic member side beyond a surface of the middle plate facing the elastic member.

* * * * *